United States Patent
Marcuse et al.

[11] Patent Number: 6,144,780
[45] Date of Patent: Nov. 7, 2000

[54] POLYMER WAVEGUIDE SWITCH AND METHOD

[75] Inventors: Dietrich Marcuse, Lincroft; Herman M. Presby, Highland Park, both of N.J.

[73] Assignee: Lucent Technologies Inc., Murray Hill, N.J.

[21] Appl. No.: 09/166,830

[22] Filed: Oct. 5, 1998

[51] Int. Cl.[7] .................. G02B 6/26; G02F 1/295
[52] U.S. Cl. .................. 385/16; 385/41; 385/42; 385/5
[58] Field of Search .................. 385/16, 27, 28, 385/39, 41, 42, 45

[56] References Cited

U.S. PATENT DOCUMENTS

| | | | |
|---|---|---|---|
| 4,753,505 | 6/1988 | Mikami et al. | 350/96.13 |
| 4,859,059 | 8/1989 | Bobb et al. | 356/345 |
| 5,251,274 | 10/1993 | Carlstroem et al. | 385/13 |
| 5,369,718 | 11/1994 | Kamata et al. | 385/21 |
| 5,465,310 | 11/1995 | Kersten et al. | 385/22 |
| 5,966,493 | 10/1999 | Wagoner et al. | 385/140 |

*Primary Examiner*—Frank G. Font
*Assistant Examiner*—Layla G Lauchman
*Attorney, Agent, or Firm*—Thomas, Kayden, Horstemeyer & Risley LLP

[57] ABSTRACT

An optical switch having a straight waveguide core with a lateral waveguide core extending therefrom. A region of polymer material is disposed in the straight waveguide core to deflect optical waves from the first waveguide core into the lateral waveguide core depending on the relative indexes of refraction between the first waveguide core and the polymer material. The temperature of the polymer material is adjusted, thereby adjusting the index of refraction of the polymer material so as to cause the deflection in a switched state, and to allow light radiation to pass through the polymer material in an un-switched state.

8 Claims, 3 Drawing Sheets

POLYMER WAVEGUIDE SWITCH AND METHOD

CROSS-REFERENCE TO RELATED APPLICATIONS

Not applicable.

STATEMENT REGARDING FEDERALLY SPONSORED RESEARCH OR DEVELOPMENT

Not Applicable.

FIELD OF THE INVENTION

The present invention relates to the field of optical waveguide technology and, more particularly, to the field of optical switches.

BACKGROUND OF THE INVENTION

Current communications networks throughout the world have embraced the use of optical fiber waveguide technology to provide a conduit of transmission components for voice, video, and data signals. Optical networks offer far greater bandwidth and reliability than do conventional electronic networks. As a consequence, current research efforts have been directed to expanding the capabilities of optical waveguide technology at reduced cost to aid in the acceleration of the conversion of the present electrical communications networks to optical communications networks.

Optical communications networks contain many different components. These include, but are not limited to, optical fiber cable, switches, attenuators, couplers, and many more such devices. Typically, these devices are comprised of a core surrounded by a cladding material. Both the materials used for the core and the cladding include silica or doped silica as well as many other similar materials. These materials are employed because they have a desirable index of refraction and as well as other properties which facilitate their use.

Even though current materials used in constructing the core and the cladding have many beneficial properties, it can be desirable to manipulate the properties of such materials to control the direction of the propagation of laser radiation through a network of waveguides. Specifically, it is often desirable to switch the propagation of a light wave from one waveguide to another. Consequently, there is a need for optical structures that facilitate the switching of optical signals between optical waveguides.

BRIEF SUMMARY OF THE INVENTION

The present invention entails the use of polymer materials in optical switching. In one embodiment, an optical switch is created having a straight waveguide core and a lateral waveguide core which extends from the side of the straight waveguide core. The straight waveguide core includes a region of polymer material which forms an optical deflection wall. The polymer material has an index of refraction which varies with temperature. When the switch is in an un-switched state, the temperature of the polymer material is set so that the index of refraction is higher than or equal to the index of refraction of the straight waveguide core. In this un-switched state, optical waves propagate along the axis of the straight waveguide core through the region of polymer material and exit from the straight waveguide core. When in a switched state, the temperature of the polymer material is set so that the polymer index of refraction is lower than the index of refraction of the straight waveguide core. In this switched state, optical waves are deflected into the lateral waveguide core by the optical deflection wall and exit from the lateral waveguide core.

In another embodiment, the present invention may also be viewed as an optical switching method which begins with the step of optically coupling a lateral waveguide core to a straight waveguide core where the lateral waveguide core extends from the straight waveguide core. Next, a polymer region is positioned in the straight waveguide core creating an optical deflection wall to deflect an optical wave into the lateral waveguide core. Next, an optical wave is transmitted into the straight waveguide core. The step of controlling the temperature of the polymer region is performed, thereby controlling the index of refraction of the polymer region. Finally, the steps of propagating the optical wave through the polymer region when in an un-switched state, and deflecting the optical wave into the lateral waveguide core when in a switched state are performed.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1:
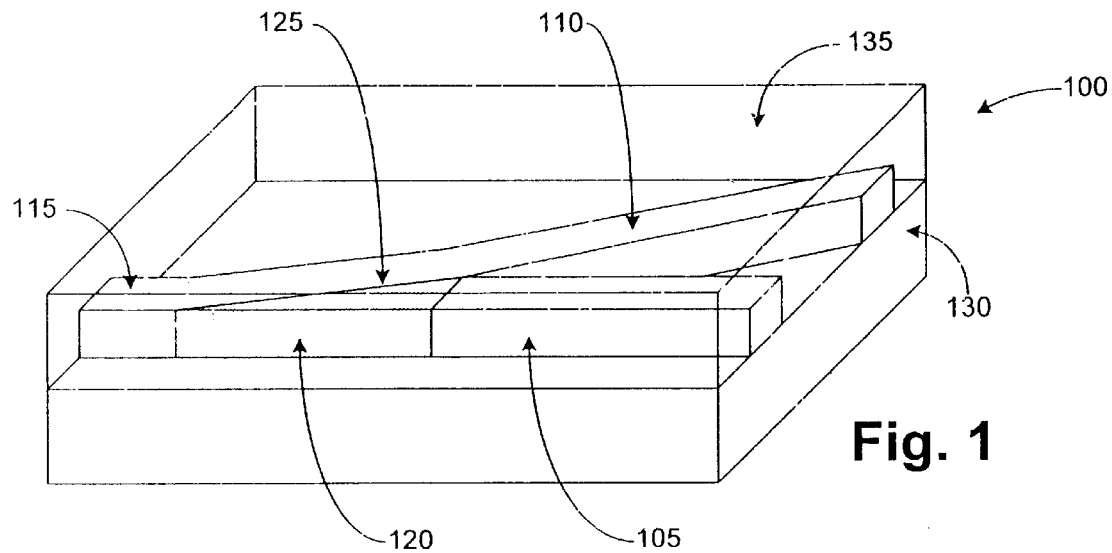
FIG. 1 shows a perspective view of an optical switch according to an embodiment of the present invention.

Turning to FIG. 1, shown is an optical switch 100 according to an embodiment of the present invention. The optical switch 100 comprises a straight waveguide core 105 and a lateral waveguide core 110. Both the straight and lateral waveguide cores 105 and 110 share a common waveguide segment 115 with the lateral waveguide core 110 extending from the side of the straight waveguide core 105. Positioned in the straight waveguide core 105 is a polymer region 120 which forms an optical deflection wall 125. The straight and lateral waveguide cores 105 and 110 are formed on a substrate 130. The surface areas of the straight and lateral waveguide cores 105 and 110 that are not in contact with the substrate 130 are surrounded with a cladding material 135.

Figure 2:
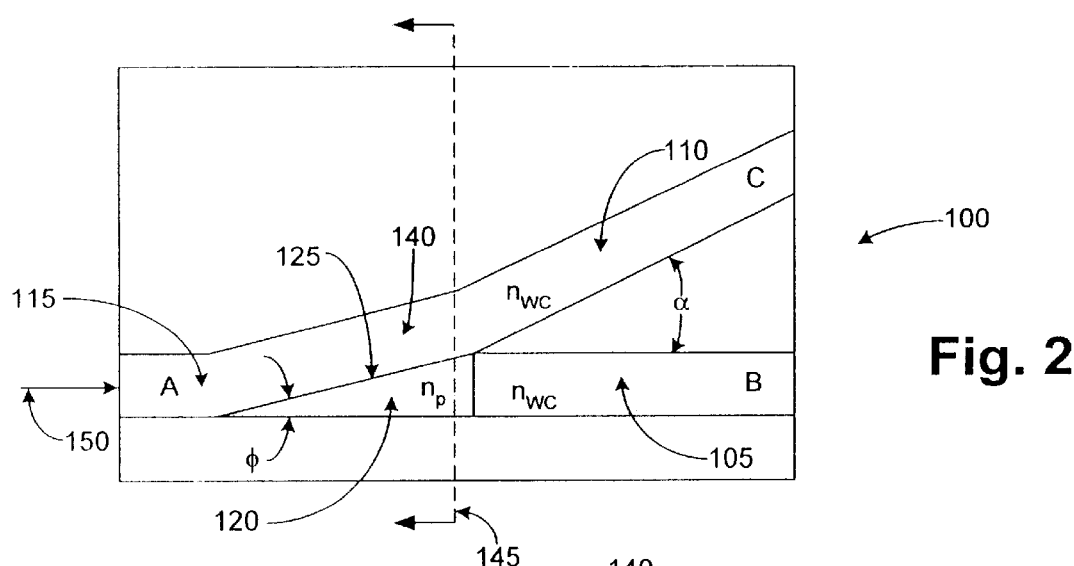
FIG. 2 shows a to view of the optical switch of FIG. 1.

Referring to FIG. 2, shown is a top view of the optical switch 100. According to this view, the lateral waveguide core 110 includes a first segment 140 which originates at the common waveguide segment 115 and extends from the straight waveguide core 105 at a first angle φ. Thereafter, the lateral waveguide core 110 extends from the first segment 140 at a second angle α with respect to the straight waveguide core 105. The first angle φ is preferably 1.8 degrees for best results, however, other angles may be used. The second angle α is preferably equal to 2 φ. This means that the change in direction between the common waveguide segment 115 and the first segment 140 is equal to the change of direction between the first segment 140 and the remainder of the lateral waveguide core 110. This common change in direction is minimized in order to minimize the loss of energy at each direction change. Also, the optical deflection wall 125 is clearly defined as bordering the first segment 140. The straight and lateral waveguide cores 105 and 110 are preferably 5 microns wide although greater or lesser widths may be employed.

The lateral waveguide core 110 includes an index of refraction of $n_{WC}$. The straight waveguide core 105 also has an index of refraction $n_{WC}$ except for the polymer region 120 which has an index of refraction $n_P$. A section line 145 is drawn across the center of the optical switch 100.

Figure 3:
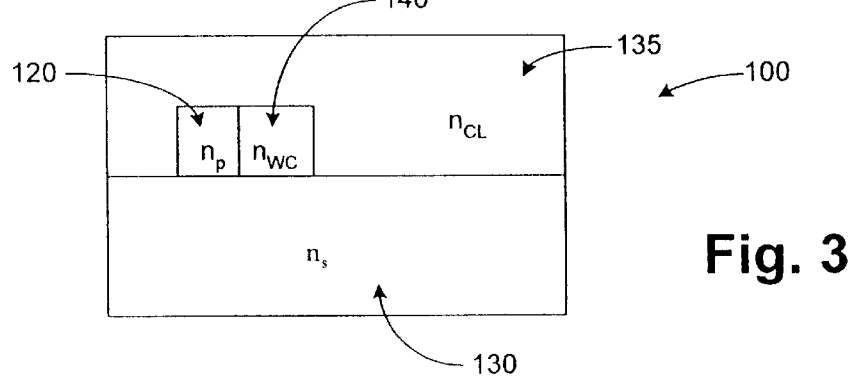
FIG. 3 shows a sectional view of the optical switch of FIG. 2.

Turning then, to FIG. 3, shown is a sectional view of the optical switch 100 taken along the section line 145 (FIG. 2). The first segment 140 of the lateral waveguide core 110 is shown with an index of refraction $n_{WC}$. Also, the polymer region 120 includes an index of refraction $n_P$. FIG. 3 shows the substrate 130 with an index of refraction $n_S$ and the cladding material 135 with an index of refraction $n_{CL}$.

The cladding material 135 and the substrate 130 are preferably created using silica or other material with similar properties and the materials used in the straight and lateral waveguide cores 105 and 110 (FIG. 2) is preferably doped silica or other material with similar properties.

The index of refraction $n_{WC}$ is specified at an identifiable value depending upon the material employed to create the straight and lateral waveguide cores 105 and 110. If doped silica is employed, then the index of refraction $n_{WC}$ may be approximately 1.4675, for example. Where silica is used for the substrate 130 and the cladding material 135, the indexes of refraction $n_S$ and $n_{CL}$ may be approximately 1.46, for example. The index of refraction $n_P$ of the polymer region 120 varies with the temperature of the polymer region 120. This range may be, for example, approximately 1.46 to 1.473.

Turning back to FIG. 2, the operation of the optical switch 100 is explained. An optical wave 150 enters the optical switch 100 at input port A. The optical wave 150 exits the optical switch 100 through either output port B or C depending upon the temperature and corresponding index of refraction $n_P$ of the polymer region 120. In an un-switched state, the optical wave 150 exits the optical switch 100 through output port B. In a switched state, the optical wave 150 exits the optical switch 100 through output port C.

Figure 4:
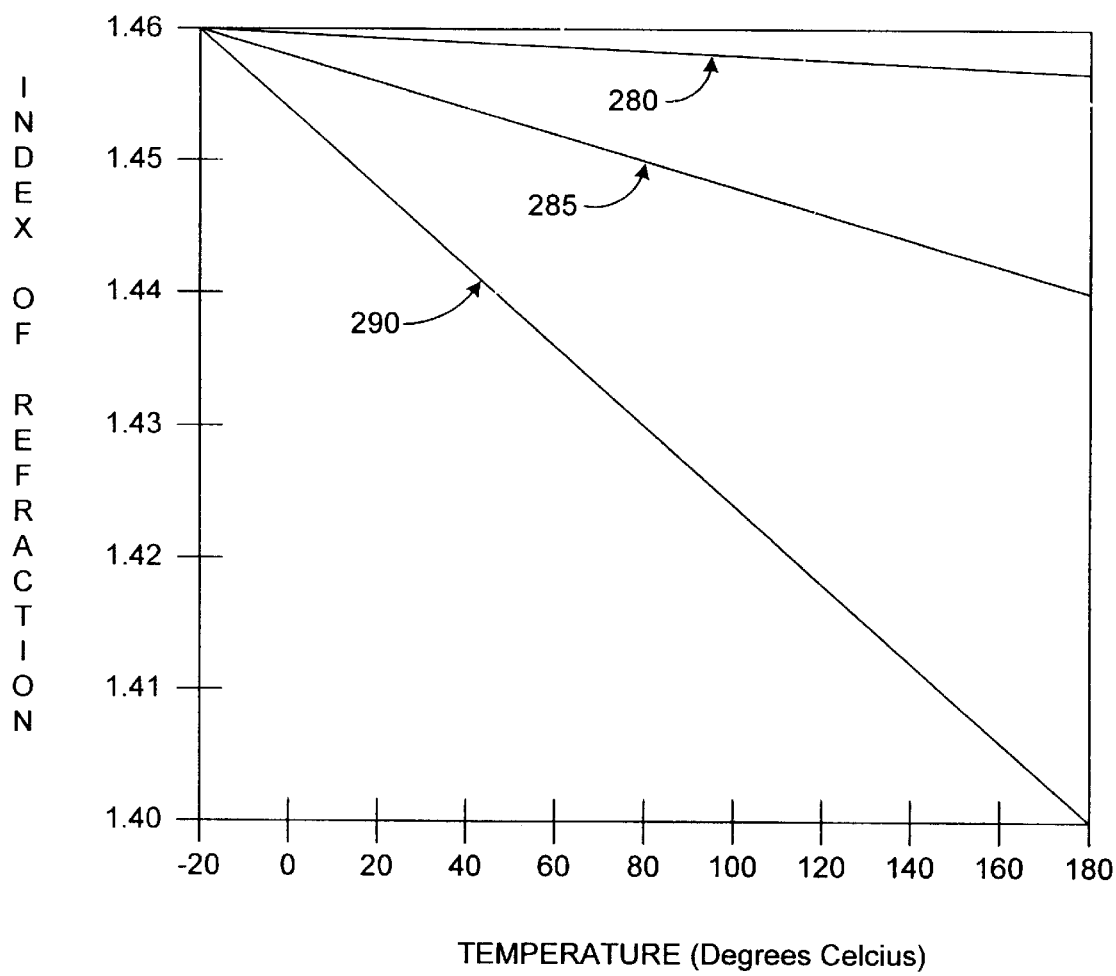
FIG. 4 shows a graph of the index of refraction of a polymer material as a function of temperature.

The optical switch 100 is placed in the un-switched state by changing the temperature of the polymer region 120, for example, by cooling so that the index of refraction $n_P$ is greater than the index of refraction $n_{WC}$, or approximately 1.473 in the above example. The actual temperature of the polymer region 120 that results in an index of refraction $n_P$ greater than the index refraction $n_{WC}$ depends upon the type of polymer material chosen as seen in FIG. 4. When the index of refraction $n_P$ is greater than the index of refraction $n_{WC}$, then the optical wave 150 proceeds straight through the polymer region 120 and the straight waveguide core 105 exiting through output port B.

The optical switch 100 is placed in the switched state by changing the temperature of the polymer region 120, for example, by heating so that the index of refraction $n_P$ is less than the index of refraction $n_{WC}$, or approximately 1.46 in the above example. The actual temperature of the polymer region 120 that results in an index of refraction $n_P$ less than the index refraction $n_{WC}$ depends upon the type of polymer material chosen. When the index of refraction $n_P$ is less than the index of refraction $n_{WC}$, then the optical wave 150 is deflected by the optical deflection wall 125 of the polymer region 120 into the lateral waveguide core 110. The optical waveguide 150 proceeds through the lateral waveguide core 110 exiting through output port C.

Referring to FIG. 4, shown is a graph depicting the index of refraction $n_P$ as a function of temperature in degrees Celsius of three example polymers which may be used according to the embodiments of the present invention. Line 280 depicts the index of refraction of F/CA polymer which has a thermal coefficient of $-0.00002C^{-1}$, line 285 depicts the index of refraction of D-PMMA/D-FA polymer which has a thermal coefficient of $-0.0001C^{-1}$, and line 290 depicts the index of refraction of FA polymer which has a thermal coefficient of $-0.0003C^{-1}$. Note that the starting point at n=1.46 and Temperature=−20° C. were chosen arbitrarily. Ultimately, the indexes of refraction of various polymers depend upon their composition and can vary over a relatively wide range as a function of temperature.

Figure 5:
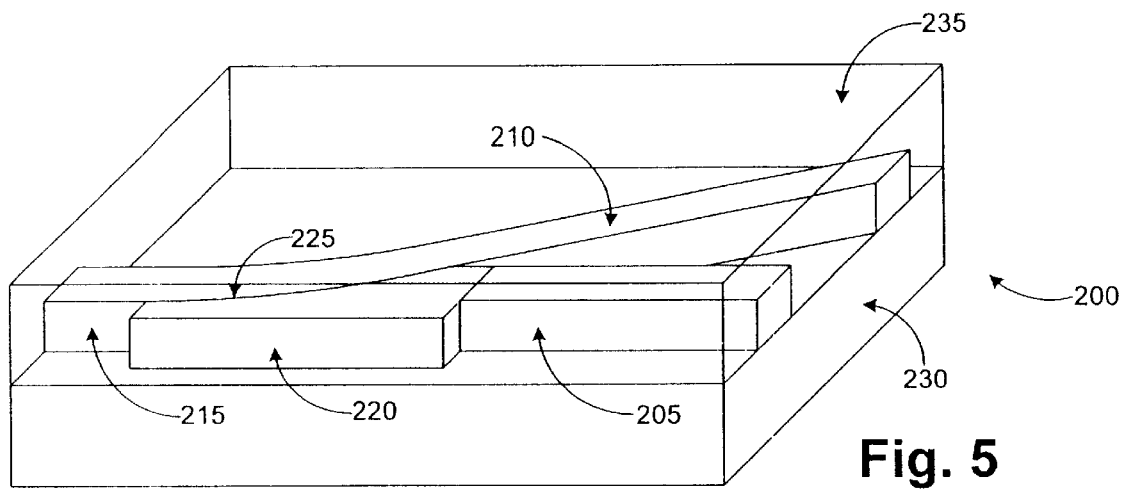
FIG. 5 shows a perspective view of an optical switch according to another embodiment of the present invention.

Referring next, to FIG. 5, shown is an optical switch 200 according to yet another embodiment of the present invention. The optical switch 200 is similar in several respects to the optical switch 100 (FIG. 1) in that it includes a straight waveguide core 205 and a lateral waveguide core 210. The straight and lateral waveguide cores originate at a common waveguide segment 215. The straight waveguide core 205 includes an extended polymer region 220 which forms a curved deflection wall 225. The straight and lateral waveguide cores 205 and 210 are formed on a substrate 230 and are surrounded by a cladding material 235.

Figure 6:
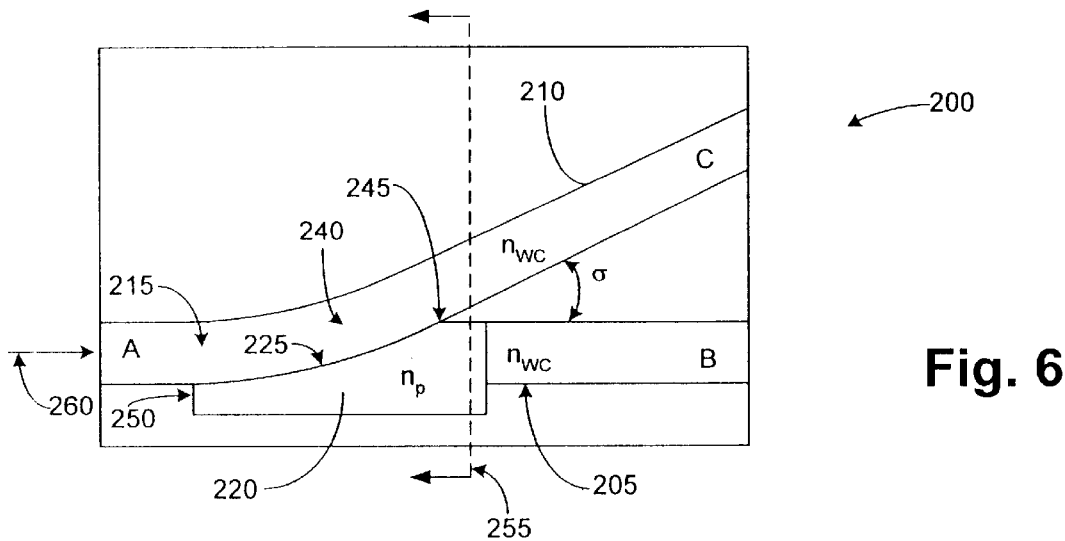
FIG. 6 shows a top view of the optical switch of FIG. 5.

Referring to FIG. 6, shown is a top view of the optical switch 200. The lateral waveguide core 210 includes a curved segment 240 which originates as a tangent that is parallel with the straight waveguide core 205 and extends from the straight waveguide core 205 forming a tangent that is at an angle σ with respect to the straight waveguide core 205. The angle σ may be 5 degrees to facilitate deflection of a light wave as will be discussed. Also, the curved deflection wall 225 is clearly defined as bordering the first segment 240. The straight and lateral waveguide cores 205 and 210 are preferably 5 microns wide although greater or lesser widths may be employed. In the optical switch 200, the extended polymer region 220 extends beyond the separation point 245. Also, the extended polymer region 220 also includes an extended width 250 that falls beyond the width of the straight waveguide core 205.

The optical switch 200 includes an input port A and output ports B and C. The straight and lateral waveguide cores 205 and 210 have an index of refraction of $n_{WC}$ and the extended polymer region 220 has an index of refraction $n_P$ similar to the optical switch 100 (FIG. 1) as shown. A section line 255 is drawn across the center of the optical switch 200.

Figure 7:
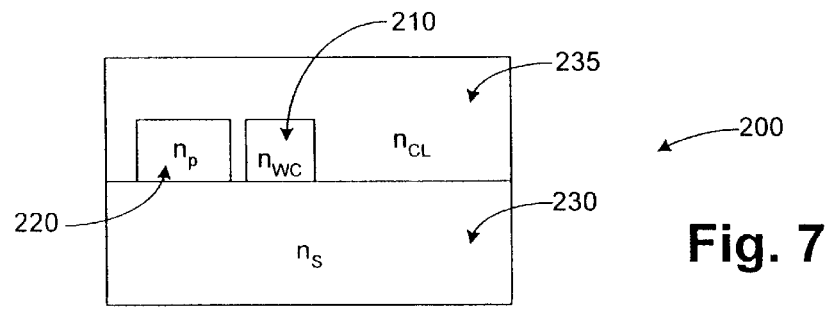
FIG. 7 shows a sectional view of the optical switch of FIG. 6.

Turning then, to FIG. 7, shown is a sectional view of the optical switch 200 taken from the section line 255 (FIG. 6). The lateral waveguide core 210 is shown with an index of refraction $n_{WC}$. Also, the extended polymer region 220 includes an index of refraction $n_P$. FIG. 7 shows the substrate 230 with an index of refraction $n_S$ and the cladding material 235 with an index of refraction $n_{CL}$.

The cladding material 235 and the substrate 230 are preferably created using silica or other material with similar properties and the materials used in the straight and lateral waveguide cores 205 and 210 (FIG. 5) is preferably doped silica or other material with similar properties.

The index of refraction $n_{WC}$ is specified at an identifiable value depending upon the material employed to create the straight and lateral waveguide cores 205 and 210. If doped silica is employed, then the index of refraction $n_{WC}$ may be approximately 1.4675, for example. Where silica is used for the substrate 230 and the cladding material 235, the indexes of refraction $n_S$ and $n_{CL}$ may be approximately 1.46, for example. The index of refraction $n_P$ of the extended polymer region 220 varies with the temperature of the extended polymer region 220. This range may be, for example, approximately 1.46 to 1.473.

Turning back to FIG. 5, the operation of the optical switch 200 is explained. An optical wave 260 enters the optical switch 200 at input port A. The optical wave 260 exits the optical switch 200 through either output port B or C depending upon the temperature and corresponding index of refraction $n_P$ of the extended polymer region 220. In an un-switched state, the optical wave 260 exits the optical switch 200 through output port B. In a switched state, the optical wave 260 exits the optical switch 200 through output port C.

The optical switch 200 is placed in the un-switched state by changing the temperature of the extended polymer region 220, for example, by cooling so that the index of refraction $n_P$ is greater than the index of refraction $n_{WC}$, or approximately 1.473 in the above example. The actual temperature of the extended polymer region 220 that results in an index of refraction $n_P$ greater than the index refraction $n_{WC}$ depends upon the type of polymer material chosen as seen in FIG. 4. When the index of refraction $n_P$ is greater than the index of refraction $n_{WC}$, then the optical wave 260 proceeds straight through the extended polymer region 220 and the straight waveguide core 205 exiting through output port B.

The optical switch 200 is placed in the switched state by changing the temperature of the extended polymer region 220, for example, by heating so that the index of refraction $n_P$ is less than the index of refraction $n_{WC}$, or approximately 1.46 in the above example. The actual temperature of the extended polymer region 220 that results in an index of refraction $n_P$ less than the index refraction $n_{WC}$ depends upon the type of polymer material chosen as seen in FIG. 4. When the index of refraction $n_P$ is less than the index of refraction $n_{WC}$, then the optical wave 260 is deflected off of the curved deflection wall 225 of the extended polymer region 220 into the lateral waveguide core 110. The optical wave 260 proceeds through the lateral waveguide core 110 exiting through output port C.

The extension of the extended polymer region 220 beyond the separation point 245 helps reduce coupling between the separating straight and lateral waveguides 205 and 210. The extended width 250 of the extended polymer region 220 is beneficial for the performance of the optical switch 200 when in an un-switched state.

Many variations and modifications may be made to the various embodiments of the present invention without departing substantially from the spirit and principles of the invention. All such modifications and variations are intended to be included herein within the scope of the present invention, as defined by the following claims.

Having thus described the invention, it is claimed:

1. An optical switching device, comprising:
   a straight waveguide core;
   a lateral waveguide core extending from the straight waveguide core; and
   a polymer region disposed in the straight waveguide core, the polymer region having an index of refraction that varies with temperature, the polymer region forming an optical deflection wall.

2. The optical switching device of claim 1, further comprising:
   a switched state where the index of refraction of the polymer region is less than the index of refraction of the straight waveguide core, wherein the deflection wall deflects a light wave into the lateral waveguide core; and
   an un-switched state where the index of refraction of the polymer region is greater than the index of refraction of the straight waveguide core, wherein a light wave propagates through the polymer region and along the straight waveguide core.

3. The optical switching device of claim 1, wherein the lateral waveguide core extends from the straight waveguide core in a first segment disposed at a first angle with respect to the straight waveguide core.

4. The optical switching device of claim 1, wherein the lateral waveguide core extends from the straight waveguide core in a curved segment.

5. The optical switching device of claim 3, wherein the lateral waveguide core includes at least one second segment coupled to the first segment, the second segment being disposed at a second angle with respect to the straight waveguide core.

6. The optical switching device of claim 4, wherein the polymer region width extends beyond the straight waveguide core.

7. The optical switching device of claim 4, wherein the polymer region extends beyond a point where the straight and lateral waveguide cores separate.

8. A method for optical switching, comprising the steps of:
   optically coupling a lateral waveguide core to a straight waveguide core, the lateral waveguide core extending from the straight waveguide core;
   positioning a polymer region in the straight waveguide core, the polymer region creating an optical deflection wall to deflect an optical wave into the lateral waveguide core;
   transmitting an optical wave into the straight waveguide core;
   controlling the temperature of the polymer region, thereby controlling the index of refraction of the polymer region;
   propagating the optical wave through the polymer region when in an un-switched state; and
   deflecting the optical wave into the lateral waveguide core when in a switched state.

\* \* \* \* \*